May 30, 1933.   A. J. MUSSELMAN   1,911,461
COASTER BRAKE
Filed Nov. 5, 1930   2 Sheets-Sheet 2
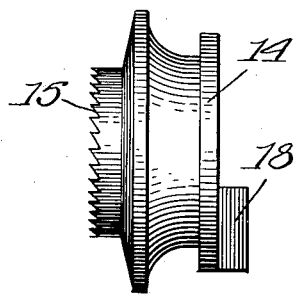
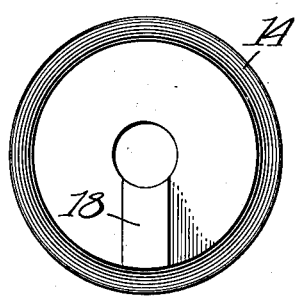
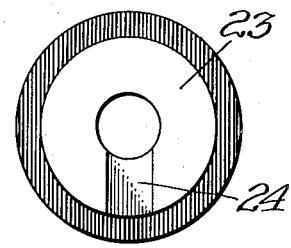
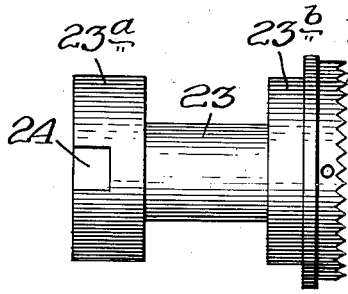
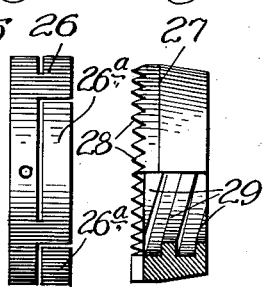
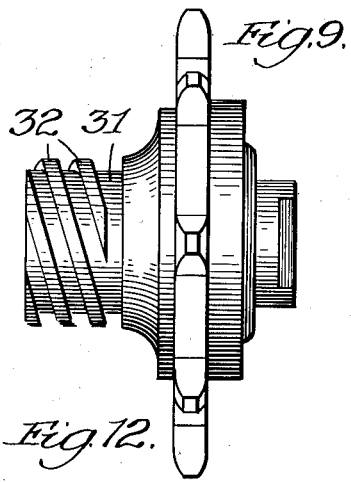
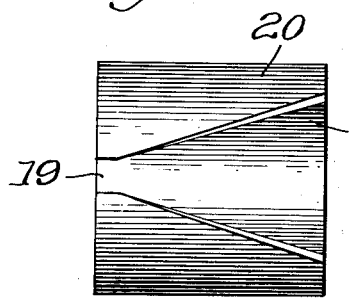
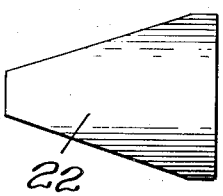
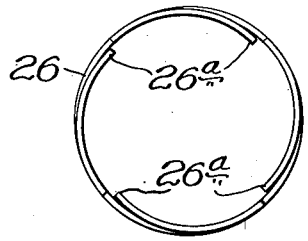

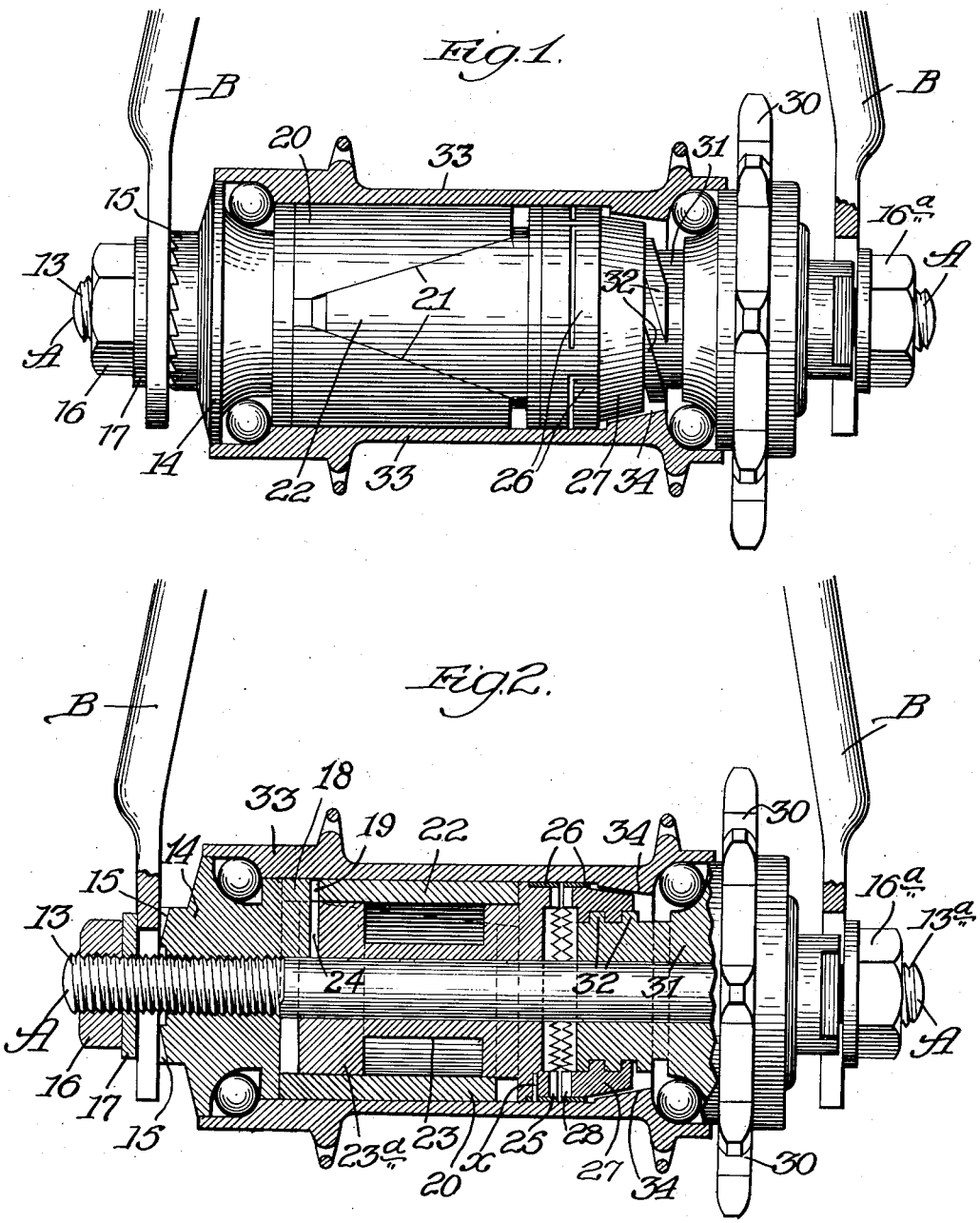

Patented May 30, 1933

1,911,461

UNITED STATES PATENT OFFICE

ALVIN J. MUSSELMAN, OF CUYAHOGA FALLS, OHIO

COASTER BRAKE

Application filed November 5, 1930. Serial No. 493,654.

My invention relates to improvements in coaster brakes of the type in which the braking effect is produced by expanding a split spring sleeve against the inner surface of a hub, as shown and described in my patent, No. 860,234.

My invention relates particularly to the construction of the split spring sleeve which is located on the axle inside the hub of the wheel.

The primary object of the invention is to secure a self-actuating braking action. Another object is to provide the brake with a spring sleeve which will be more durable than the spring sleeve described in the above-mentioned patent.

The invention is illustrated in a preferred embodiment in the accompanying drawings, in which—

Figure 1 shows my improved coaster brake, mounted in its bearings, by a plan sectional view, with the braking mechanism inside the cylindrical hub in elevation; Fig. 2 is a similar view showing the hub and the braking mechanism co-operating with it, as well as other parts, in section, the parts in this figure, as well as those in the preceding figure, being shown in the relative positions they occupy for coasting; Fig. 3 is a view in side elevation of a ball-race ratcheted interlocking collar; Fig. 4, an inner face view of the same; Fig. 5 is an end view of a ratcheted spool adapted to loosely surround the stationary rear shaft and to be held against rotation by engagement with the aforesaid collar, while having a limited longitudinal movement; Fig. 6, a view of the same in side elevation; Fig. 7, a view in elevation of a spring band to surround the ratcheted end of the spool upon which it is fastened; Fig. 8 is a view in broken sectional elevation of the externally tapering and internally threaded ratchet-faced collar for binding the hub to the sprocket for the driving purpose of the device; Fig. 9 is a view in side elevation of the driving sprocket for the rear wheel, provided with an externally threaded hub to enter and co-operate with the collar shown in Fig. 8; Fig. 10 is a view in elevation of the improved expansible split spring sleeve adapted to fit inside the hub and to be expanded against the inner surfaces of the latter for producing the braking action; Fig. 11, a similar view of the wedge for spreading the sleeve of Fig. 10; and Fig. 12 is an end view of the spring-band shown in Fig. 7.

A is the rear axle of a bicycle or motorcycle, having its bearings, as usual, in the members of the rear fork B, in which it is non-rotatably supported. Upon one threaded end 13 of the axle is screwed a ball-race collar 14 provided on its outer face with a ratchet 15, between which and a nut 16, screwed on the end of the axle against a washer 17, is clamped the adjacent member of the fork B. By thus clamping this fork member, engagement of its inner surface with the teeth of the ratchet 15 is produced, thereby providing a simple and effective means for securing the braking mechanism against rotation. The collar 14 is provided on its inner face with a lug 18, to enter a corresponding recess 19 in the adjacent end of a split spring-sleeve 20 surrounding the axle about the spool thereon, hereinafter described, and abutting against the collar. The split 21 in the spring-sleeve is wedge-shaped to receive a wedge 22 for expanding the sleeve, as and for the purpose hereinafter described. The spool 23, which fits loosely about the axle inside the sleeve 20, is provided in its head 23$^a$ with a recess 24 to receive the lug 18, which also enters the sleeve-recess 19, to hold the spool against rotation while permitting to it a limited longitudinal movement. The opposite head 23$^b$ of the spool is faced with a ratchet 25 of greater diameter than the head on which it is provided; and this ratchet is surrounded by a spring-band 26 pinned to the spool, as indicated at $x$ (Fig. 2), and protruding, as an annular spring, beyond the face on this ratchet.

The preferred construction of the ring 26 is that illustrated, of an endless band having a series of arc-shaped spring-tongues 26$^a$ extending about its outer section, and formed by cutting the band at intervals transversely and extending each transverse cut from its inner end part way about the circumference of the band. This spring band part way overlaps and yieldingly bears against the outer surface of a collar 27 surrounding the axle and provided about its inner face with a ratchet 28 opposing the ratchet 25 to engage therewith, the interior of the collar 27 being provided with coarse threads 29 of great pitch and the exterior surface of this collar tapering outwardly. At 30 is shown the driving-sprocket containing in its outer end a ball-bearing (not shown, but of ordinary or any suitable construction). From the inner face of the sprocket extends a hub 31 carrying coarse screw-threads 32, this hub screwing into the collar 27 about the axle, adjacent to the threaded end 13ª thereof at which it is fastened by a nut 16ª to the other member of the fork B. A ball-race is provided, as shown, about the inner face of the sprocket 30, like that formed about the collar 14, to afford ball-bearings for the ends of the wheel-hub 33, which houses the ball-bearings at its ends and envelops the intermediate mechanism described. Where the wheel-hub, near its end adjacent to the sprocket, surrounds the tapering collar 27, it is provided about its internal surface with an outwardly tapering section 34, in which the collar 27 works, as and for the purpose hereinafter described.

The operation of the device is as follows: As the parts of the mechanism are represented in Figs. 1 and 2, they occupy, as hereinbefore stated, their relative positions for coasting. That is to say, the hub 33 is free to rotate on its ball-bearings without turning any of the mechanism inside it, since the collar 27 is out of contact with the tapering surface 34 in the wheel-hub, and the ratchets 28 and 25 are out of engagement with each other. The act of "pedaling", by turning the sprocket 30 and thus rotating the wheel in the forward direction, screws the thread 32 on the hub 31, by the initial slight portion of a turn of the sprocket, into the collar 27, without, however, exerting sufficient force by the screwing action to overcome the retaining pressure of the spring 26 and thus rotate the collar 27; so that the screwing of the hub 31 into the adjacent collar 27 draws the latter toward the sprocket, with the effect of engaging the outer tapering surface of the collar with the tapering surface 34 within the wheel-hub 33, which results, by the ensuing clutch-action, in binding the wheel-hub to the collar 27, and thus to the hub of the sprocket, whereby the pedaling, in turning the sprocket also turns the wheel-hub and with it the rear wheel. The braking operation is performed by "back-pedaling", which involves reversal of the sprocket 30 and resultant turning of the threads of the sprocket-hub 31 in the direction to force the collar 27 toward the left and engage its ratchet 28 with the ratchet 25 on the spool 23; upon which engagement the stress of back-pedaling by pressing the collar 27, by longitudinal movement thereof, against the ratcheted-end of the spool, forces the latter against the wedge 22, which is thus driven into the split 21 of the sleeve 20 sufficiently far to expand the sleeve with great force against the surface surrounding it of the wheel-hub, thus locking the latter to the stationary axle A, since the split sleeve and spool are locked, against rotary movement about the axle, to the ball-race collar 14 by the lug 18, and the ball-race collar is itself screwed, and thus rigid, upon the axle. As will be understood, when, in pedaling, the rider stops turning the pedals and therefore stops the sprocket, the momentum of the rear wheel in carrying the hub 33 and the collar 27 engaging with it, through a very small portion of a complete rotation of the wheel-hub causes the collar 27 to turn on the threaded hub of the sprocket in the direction to withdraw the collar from engagement with the beveled surface 34 in the wheel-hub; and, obviously, the moment that disengagement is effected between the beveled binding-surfaces, the wheel-hub is free to rotate independently for coasting.

While the braking mechanism disclosed in Patent No. 860,234 has proven to be effective, a self-actuating braking effect has been obtained by placing the notch adapted to retain the lug 18 at the apex of the split 21 in the sleeve 20. By means of this arrangement, the entire external surface of the sleeve 20 comes in intimate contact with the surface of the wheel-hub while in the mechanism shown in the above-mentioned patent, only the upper surface of the sleeve, as shown in Fig. 10, performed the braking action. As a result, the upper surface of the sleeve wore out much faster than the lower surface, necessitating replacements of the sleeve. Another advantage of my improvement is that the improved sleeve is stronger and more durable and less apt to split in its back portion, which receives the greatest strain when the braking operation is performed, since the back section in my improved sleeve is solid.

What I regard as new, and desire to secure by Letters Patent, is:

1. In a coaster brake of the type set forth, means of interlocking a brake sleeve, a spool, and a ball-race collar, consisting of a stationary axle, said ball-race collar being rigidly secured on said axle and provided with a lug, said spool loosely surrounding said axle and having a recess to retain said lug, said braking sleeve surrounding said spool and split to form a wedge-shaped opening in its wall, and a recess at the apex of said wedge-shaped opening to retain said lug, thereby serving as the sole means of preventing the rotation of said braking sleeve.

2. In combination, a coaster brake having a stationary threaded axle and a sprocket, a wheel-hub rotatably surrounding the axle, a rigid ball-race collar screwed on said axle and provided with a lug, a ratchet on the outer face of said ball-race collar, a brake sleeve surrounding said axle provided with a wedge-shaped opening in its wall, whereby the entire external surface of said sleeve acts as a self-actuating braking surface, a notch at the apex of the wedge-shaped opening to retain said lug, a wedge for expanding said sleeve, means for driving the wedge, bearings for the axle ends, and a nut on an end of the axle between which and said ratchet the adjacent bearing is clamped.

3. A coaster brake comprising, in combination, a stationary axle having at one end a rigid ball-race collar provided with a lug and on its opposite end a sprocket rotatably mounted and provided with an externally threaded hub and a ball-race, a spool loosely surrounding said axle and provided with a notch to retain said lug, a sleeve surrounding said spool in which the entire external surface acts as a self-actuating braking surface, a wedge-shaped opening in said sleeve, a notch at the apex of said opening adapted to retain the lug mounted on the ball-race collar, thereby serving as the sole means of preventing rotation of said sleeve, a wedge confined in said opening and engaged by the ratcheted end of said spool, a spring band on and projecting beyond said spool-end, an internally threaded collar in which said threaded sprocket hub works, over-lapped by said spring-band and provided with a ratchet face and a tapering circumferential surface, and a wheel-hub rotatable at its ends on ball-bearings in said races and provided with an internal tapering section to co-operate with said tapering collar for the purposes set forth.

In witness whereof, I have hereunto set my hand, this 31st day of October, 1930.

ALVIN J. MUSSELMAN.